United States Patent
Diener et al.

(10) Patent No.: US 7,084,971 B2
(45) Date of Patent: Aug. 1, 2006

(54) TECHNOSCOPE

(75) Inventors: Jörg Diener, Oberderdingen (DE); Frank Schlagenhauf, Neulingen (DE)

(73) Assignee: Richard Wolf GmbH, Knittlingen (DE)

( * ) Notice: Subject to any disclaimer, the term of this patent is extended or adjusted under 35 U.S.C. 154(b) by 87 days.

(21) Appl. No.: 10/825,941

(22) Filed: Apr. 16, 2004

(65) Prior Publication Data

US 2004/0227936 A1 Nov. 18, 2004

(30) Foreign Application Priority Data

Apr. 16, 2003 (DE) ................ 103 17 488

(51) Int. Cl.
*G01N 21/00* (2006.01)
(52) U.S. Cl. ................. 356/241.1
(58) Field of Classification Search ............ None
See application file for complete search history.

(56) References Cited

U.S. PATENT DOCUMENTS

| | | | |
|---|---|---|---|
| 3,823,482 A * | 7/1974 | Schiler | ............ 33/520 |
| 4,078,864 A | 3/1978 | Howell | |
| 5,335,061 A | 8/1994 | Yamamoto et al. | |
| 5,349,940 A | 9/1994 | Takahashi et al. | |
| 5,475,485 A | 12/1995 | Diener | |
| 5,565,981 A * | 10/1996 | Winstead et al. | ....... 356/241.1 |
| 5,656,011 A | 8/1997 | Uihlein et al. | |
| 5,803,680 A | 9/1998 | Diener | |
| 6,009,189 A | 12/1999 | Schaack | |
| 6,152,870 A | 11/2000 | Diener | |
| 6,532,840 B1 * | 3/2003 | Hatley et al. | ............ 73/866.5 |
| 2003/0032863 A1 | 2/2003 | Kazakevich | |

FOREIGN PATENT DOCUMENTS

| | | |
|---|---|---|
| DE | 34 05 514 | 8/1985 |
| DE | 44 32 677 | 3/1996 |
| DE | 44 34 863 | 4/1996 |
| DE | 195 24 770 | 1/1997 |
| DE | 195 37 812 | 1/1997 |
| DE | 197 27 419 | 2/1999 |
| JP | 63-193121 | 8/1988 |

OTHER PUBLICATIONS

Office Action dated Mar. 25, 2004 for the corresponding German Application No. 103 17 488.5.

* cited by examiner

*Primary Examiner*—Tu T. Nguyen
(74) *Attorney, Agent, or Firm*—Cohen, Pontani, Lieberman & Pavane

(57) ABSTRACT

A technoscope for examining surfaces in confined spaces includes a shank on whose distal end a pivotable arm with a measuring device is arranged, which may be pivoted from a first position in which the arm extends in the longitudinal direction of the shank into a second position in which the arm extends bent at an angle to the longitudinal axis of the shank.

17 Claims, 3 Drawing Sheets

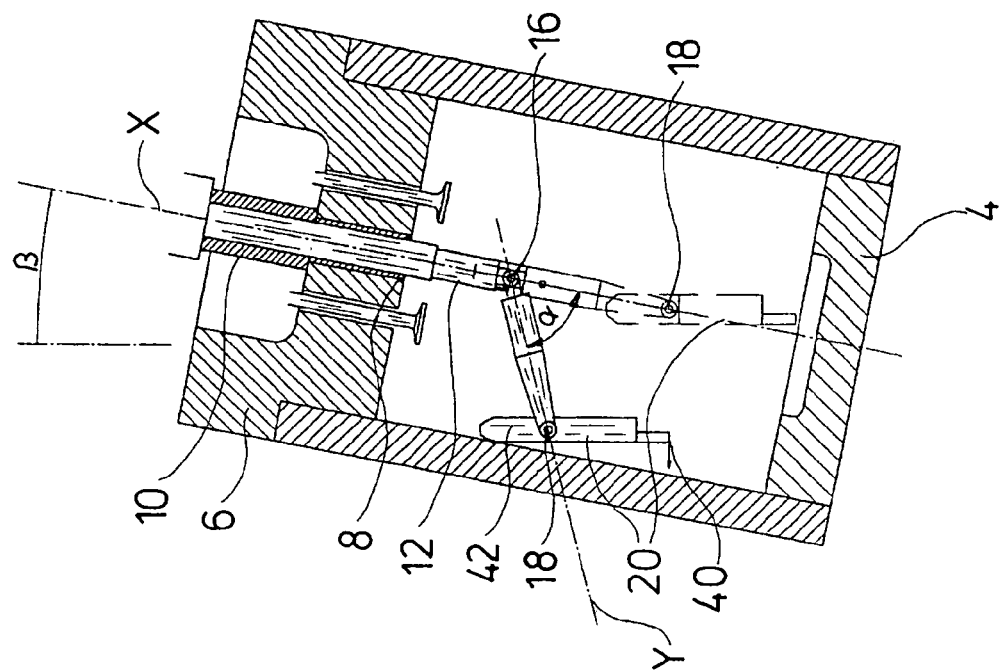
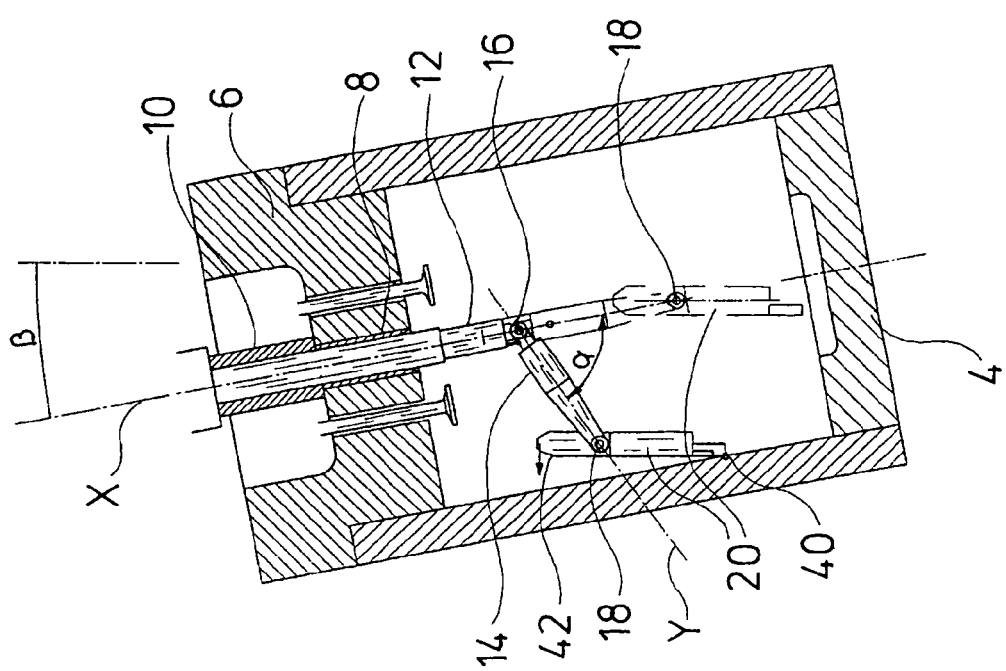

TECHNOSCOPE

BACKGROUND OF THE INVENTION

1. Field of the Invention

The invention relates to a technoscope for examining surfaces in confined spaces or cavities.

2. Description of the Related Art

Technoscopes, which are known for example from U.S. Pat. No. 4,078,864, are used for the optical examination of restricted spaces, in particular difficult to access cavities of machines and motors. Such technoscopes are for example used in order to optically examine the cylinder spaces of combustion motors. Since with motors, the service intervals are becoming less and less frequent, a simple optical inspection of the combustion space is no longer adequate. The condition of the motor may be determined more exactly by way of roughness measurement of the running surfaces. For this however the motor needs to be opened in order to be able to carry out a roughness measurement on the inner walls of the cylinder. The opening of the motor is very time-consuming and costly, in particular with large motors such as ship's motors.

SUMMARY OF THE INVENTION

It is therefore the object of the invention to create a device which permits a simplified examination of surfaces in confined spaces or cavities.

The technoscope according to the invention is suitable for examining surfaces in restricted spaces, for example the cylinder walls in the inside of combustion motors. The technoscope comprises a shank on whose distal end a pivotable arm with a measuring device is arranged. At the same time the pivotable arm may be arranged in a first position such that the arm extends in the longitudinal direction of the shank. Furthermore the arm may be pivoted into at least a second position in which the arm extends angled or bent at an angle, respectively, i.e. at an angle >0° and <180°, preferably at an angle >0° and <90° to the longitudinal axis of the shank. This design permits the pivotable arm in its first position to be introduced together with the shank through the opening into the space to be examined. Thus the shank with the extended arm, thus the arm extended in the direction of the longitudinal axis of the shank, may be introduced into the cylinder space of a combustion motor, for example through the spark plug or glow plug bore or injection nozzle bore. If the arm is located in the inside of the space to be examined, for example the cylinder space of a combustion motor, the arm may then be pivoted into its second position so that the arm may be pivoted out of the longitudinal axis of the shank. This permits an outer distal end of the arm to be brought into a position which is situated radially further distanced from the longitudinal axis of the shank than the outer circumference of the shank. Thus the pivotable arm permits a measuring device attached to the pivotable arm to be brought onto the surface of a space to be examined, which radially is further distanced to the longitudinal axis of the shank than the inner wall of the opening through which the shank was inserted. In this manner one may examine undercuts in closed spaces by way of the measuring device. Thus by way of pivoting the arm, the measuring device may for example be brought onto the inner wall of a cylinder of a combustion motor which has a larger distance to the longitudinal axis of the shank than the wall of the spark plug or glow plug bore through which the shank is introduced into the cylinder.

The arm with the measuring device, in its first position is preferably arranged completely within the cross section of the shank. This has the advantage that an opening into which the technoscope is introduced need not have a larger cross section than the shank of the technoscope. Its shank determines the largest cross section of the technoscope. If the technoscope with the shank is introduced into an opening, the arm with the measuring device may be pivoted out within the larger hollow space behind the opening in order to bring the measuring device onto an inner wall of the cavity in order to examine the inner wall with regard to measurement technology.

The proximal end of the arm is preferably articulated on the shank and the measuring device is attached at the distal end of the arm. This arrangement permits the maximal radial distance of the measuring device to the longitudinal axis of the shank to be achieved in order to also be able examine cavities or their inner wall with the help of the measuring device. The proximal end of the arm at the same time is articulated on in the vicinity of the longitudinal axis of the shank. The maximal radial deflection of the measuring device from the longitudinal axis of the shank is achieved at an angle of 90° between the longitudinal axis of the arm and the longitudinal axis of the shank. With this the maximal radial deflection of the measuring device is essentially dependent only on the length of the arm. This has the advantage that the technoscope may be easily adapted such that very large cavities may be examined without the diameter of the shank having to be enlarged. For larger cavities the arm merely needs to be designed correspondingly long. The shank diameter of the technoscope may be kept small so that the technoscope may be introduced into cavities through very small openings.

The measuring device is preferably a roughness measurement apparatus. This permits roughness measurements, for example on the inner wall of cylinder spaces of combustion motors to be carried out with the help of the technoscope according to the invention. The roughness measurement apparatus may at the same time be designed in the usual manner. Suitable roughness measurement apparatus are for example offered by the company Mahr under the description PFM or PFM 2. Instead of a roughness measurement apparatus one may however also provide any other measuring device in order to be able to carry out suitable measurements in the inside of the space to be examined and in particular on its surfaces. For example, a laser measurement system may be provided.

The measuring device is further preferably pivotably attached to the arm. This permits the measuring device to have an improved contact on the surfaces of a cavity which are to be examined. This is particularly the case if the surfaces to be examined run in an inclined or arcuate manner. The measuring device may then be pivoted relative to the arm so that it may be brought optimally into contact or into an optimal position to the surface to be examined. According to one preferred embodiment of the invention the measuring device is attached on the arm in a freely pivotable manner so that it contacts the surface to be examined in a self-adjusting manner.

The technoscope according to the invention is suitable for examining surfaces in restricted spaces, for example the cylinder walls in the inside of combustion motors. The technoscope comprises a shank on whose distal end a pivotable arm with a working device, in particular a measuring device is, arranged. At the same time the pivotable arm may be arranged in a first position such that the arm extends in the longitudinal direction of the shank. Furthermore the arm may be pivoted into at least a second position in which the arm extends angled or bent at an angle, respectively, i.e. at an angle >0° and <180°, preferably at an angle >0° and <90° to the longitudinal axis of the shank. This design permits the pivotable arm in its first position to be introduced together with the shank through the opening into the space to be examined. Thus the shank with the extended arm, thus the arm extended in the direction of the longitudinal axis of the shank, may be introduced into the cylinder space of a combustion motor, for example through the spark plug or glow plug bore or injection nozzle bore. If the arm is located in the inside of the space to be examined, for example the cylinder space of a combustion motor, the arm may then be pivoted into its second position so that the arm may be pivoted out of the longitudinal axis of the shank. This permits an outer distal end of the arm to be brought into a position which is situated radially further distanced from the longitudinal axis of the shank than the outer circumference of the shank. Thus the pivotable arm permits a measuring device attached to the pivotable arm to be brought onto the surface of a space to be examined, which radially is further distanced to the longitudinal axis of the shank than the inner wall of the opening through which the shank was inserted. In this manner one may examine undercuts in closed spaces by way of the measuring device. Thus by way of pivoting the arm, the measuring device may for example be brought onto the inner wall of a cylinder of a combustion motor which has a larger distance to the longitudinal axis of the shank than the wall of the spark plug or glow plug bore through which the shank is introduced into the cylinder.

The center of gravity of the measuring device is preferably situated distanced to a pivot axis about which the measuring device may be pivoted. This arrangement favors the automatic alignment of the measuring device if this is freely pivotable about the pivot axis relative to the arm. The center of gravity at the same time lies in a position vertically below the pivot axis so that the measuring device always aligns automatically in the vertical direction.

The measuring device is preferably arranged pivotable relative to the arm in a manner such that a longitudinal axis of the measuring device in the first position of the arm runs parallel to the longitudinal axis of the shank and the longitudinal axis of the arm. This means that the complete technoscope in the first position of the arm is arranged extended in the longitudinal direction of the shank and has a minimal cross section which is preferably limited by the maximal cross section of the shank. The technoscope may thus be easily introduced into a narrow opening, for example a spark plug or glow plug bore or injection nozzle bore, into a cylinder space.

The pivot axis of the measuring device is preferably arranged between two ends of the measuring device which are opposite to one another in the longitudinal direction, and distanced to these ends. The two ends of the measuring device which are distanced to one another and to the pivot axis at the same time serve as bearing shoulders or counter bearings, which permit a simple alignment of the measuring device on the wall or surface to be examined. In particular, if the measuring device is designed such that its center of gravity is located outside its pivot axis, then with an oblique or inclined surface, one of the ends of the measuring device firstly comes into contact with the surface of the cavity to be measured on pivoting the arm. Which of the ends comes firstly into contact with the surface in particular depends on the inclination of the surface to the vertical. If the first end has come into contact with the surface, the arm is pivoted further away from the longitudinal axis of the shank, by which means the pivot axis of the measuring device may be moved more onto the surface to be examined and finally the second end of the measuring device also comes to bear on the surface. A very simple forced alignment of the measuring device parallel to the surface to be examined becomes possible in this manner.

The arm is preferably pivotable relative to the shank via a drive means arranged in the shank. An actuation rod may for example be arranged in the inside of the shank, and the distal end of this rod articulated on the arm, distanced to the pivot axis of the arm. By way of linear movement of the actuation rod in the longitudinal direction of the shank, the arm in this manner may be pivoted relative to the longitudinal axis of the shank. Alternatively other suitable drive means may be arranged in the shank in order to be able to pivot the arm relative to the longitudinal axis of the shank. This may for example be electromechanical, pneumatic or hydraulic drive means.

An actuation means for actuating the drive means is arranged preferably at the proximal end of the shank for pivoting the arm relative to the shank. The drive means may thus be moved via the actuation means in order to pivot the arm. One may for example provide an adjustment wheel which on rotation creates a linear movement of an actuation rod parallel to the longitudinal axis of the shank which in turn, as described above, effects a pivoting of the arm relative to the longitudinal axis of the shank.

It is further preferred for optics to be able to be applied into the shank of the technoscope according to the invention. The optics may be designed in the known manner as with known technoscopes and endoscopes. At the same time the optics are preferably designed such that they permit a view in the radial direction proceeding from the shank, so that the region which is to be examined by the measuring device may be simultaneously examined optically. Instead of optics a video transmission system according to known video technoscopes may also be used.

According to a preferred embodiment, the technoscope a guide sleeve in which the shank may be applied and which may be fixed in an opening of the space to be examined. The guide sleeve serves for the exact positioning and fixation of the technoscope in the cavity to be examined. First the fixation sleeve is fixed in the opening through which the technoscope is to be introduced into the space to be examined and subsequently the technoscope is introduced through the fixation sleeve into the space to be examined.

The guide sleeve preferably has a thread on its outer circumference. With this thread the guide sleeve may be screwed into a thread of an opening of the cavity to be examined. For this, the outer diameter of the fixation sleeve and the thread incorporated on this are preferably adapted to a thread which is present in the opening of the object to be examined. The outer thread of the guide sleeve may for example be adapted to an inner thread of a spark plug or glow plug bore or an injection nozzle bore of a combustion motor. For attaching the fixation sleeve, in this case the injection nozzle or the spark plug or glow plug is firstly screwed out of the motor and the fixation sleeve is then screwed into the corresponding bore and subsequently the technoscope is introduced through the fixation sleeve into the cylinder space.

The shank is preferably displaceably held in its longitudinal direction or held rotatable about its longitudinal axis, in the guide sleeve. This permits the shank to move in the inside of the guide sleeve with as little play as possible, in order in this manner to be able to bring the measuring device into various positions in the inside of the cavity to be examined, or with the help of the optics arranged in the shank to be able to observe various regions of the cavity. With these movements the shank is moved in the guide sleeve so that for example the radial distance of the measuring device to the longitudinal axis of the cavity to be examined may be kept constant.

At the same time preferably scales are provided for reading an insertion depth and/or an angular position of the shank relative to the guide sleeve. The examined region of the cavity may be determined and documented with the help of these scales by way of corresponding coordinates. The position of the measuring device in the inside of the cavity to be examined may be read off by way of the scales. Additionally a scale may be provided for reading off the angular position of the arm relative to the longitudinal axis of the shank, so that with a known length of the arm one may also read off the radial position of the measuring device relative to the longitudinal axis of the shank. Furthermore, by way of this, with a known length of the arm, the distance of the measuring device to the distal end of the shank in the direction of the longitudinal axis of the shank may be determined.

The arm may be flexibly designed according to a particular embodiment. With such an arm one may make do without a joint or a pivot axis between the arm and the shank. Instead of this the arm itself is designed flexibly and may be infinitely pivoted due to its flexibility so that the distal end of the arm may be brought into an angular position to the longitudinal axis of the shank. By way of this, even with a flexible arm, a measuring device arranged at the distal end of the arm may be brought into a position which is deflected radially with respect to the shank, in order to examine a surface in the inside of a cavity. The design of the flexible arm at the same time corresponds to the technical construction as is known from flexible endoscopes or fibrescopes.

Alternatively a machining tool may be arranged at the distal end of the arm instead of a measuring device. This permits the technoscope according to the invention not only to carry out measurements, but also machining in difficultly accessible spaces and in particular on their inner wall.

At least one further shank able to be bent at an angle may be preferably applied into the shank. Such an additional shank may preferably be introduced into the shank from the proximal end in order for example to introduce a machining tool through the additional shank into the space to be examined or machined. Such machining tools may be e.g. pliers, brushes or cleansing nozzles in order to be able to clean and/or machine in the space to be examined. Either a rigid arm able to bent at an angle via a joint is arranged at the distal end of the further shank, or the shank is designed flexibly at least in its distal region, in order to be able to deflect the shank radially and to be able to reach radially distanced surfaces in the cavity. The design of the further shank at the same times corresponds preferably to the design of the first shank and of the arm, as has been described above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
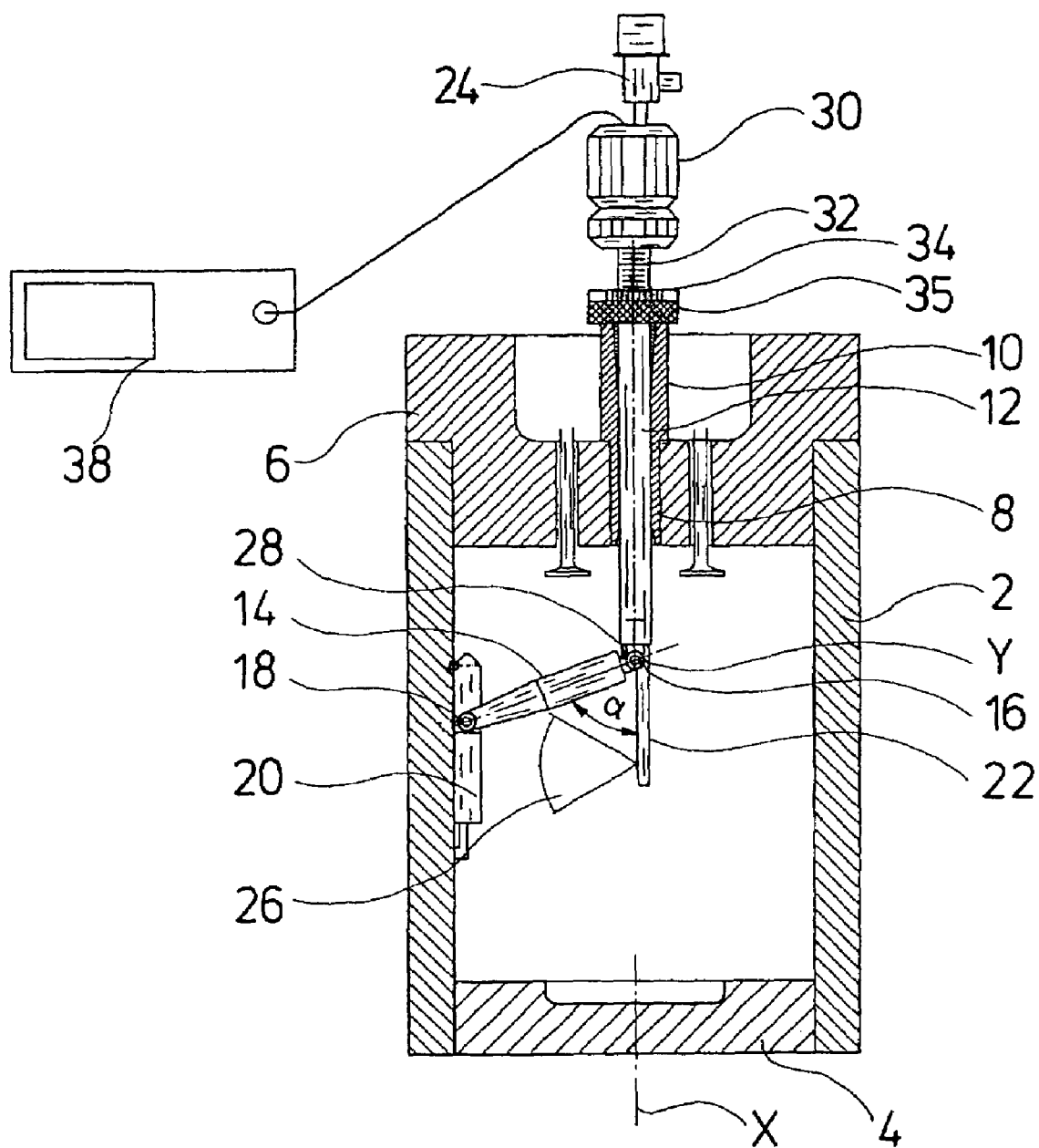
FIG. 1 a sectioned view of a cylinder space with an inserted technoscope according to the invention, FIG. 2 a sectioned view according to FIG. 1 with an inclined attitude of the cylinder space, FIG. 3 a sectioned view according to FIGS. 1 and 2, with which the cylinder space is inclined in a direction opposite to FIG. 2 and FIG. 4 a sectioned view of a cylinder space with an inserted technoscope according to a second embodiment.

FIG. 1 shows a section view of a cylinder 2 of a combustion motor, for example a ship's motor. On examination the piston 4 is preferably located at the lower dead center. A bore 8 is located in the cylinder head next to the inlet and outlet openings with the valves. The bore 8 is arranged centrally in the cylinder in the direction of the longitudinal axis X. In operation, the bore serves for accommodating the injection nozzle of the cylinder. The injection nozzle (not shown here) is screwed out for examining the inner space of the cylinder 2. A guide sleeve 10 is screwed into the bore 8 from which the injection nozzle is removed, and this sleeve has an outer thread corresponding to the inner thread in the bore 8. The shank 12 of the technoscope is inserted into the guide sleeve 10 of the technoscope from the proximal end of the guide sleeve 10. At the same time the shank 12 is introduced through the guide sleeve 10 from the outside into the inner space of the cylinder 2. An arm 14 is arranged pivotable about a pivot axis 16 at the distal outer end of the shank 12. The pivot axis 16 extends normally to the longitudinal axis X and intersects this. A second pivot axis 18 is formed at the distal end of the arm 14, via which a measuring device in the form of a roughness measurement apparatus is pivotably connected to the arm 14.

By way of pivoting the arm 14 in the direction of the angle α relative to the longitudinal axis X of the shank 12, the measuring device 20 is brought to contact the inner wall of the cylinder 2. The pivot axis 18 at the same time extends parallel to the pivot axis 16 so that the measuring device 20 may extend parallel to the longitudinal axis X and the inner wall of the cylinder 2, independently of the size of the angle α. With an increasing angle α, the measuring device 20 is brought into a position which is radially distanced further from the longitudinal axis. Thus the inner spaces of cylinders with different diameters may be examined.

Optics 22 extending parallel to the longitudinal axis X are arranged in the inside of the shank 12. The optics 22 may be inserted into the shank 12 from the proximal end. This permits the optics to also be able to be removed in order to introduce other instruments through the shank 12 into the cylinder space 2. The optics 22 are designed in the known manner and at their proximal end 24 comprise a viewing opening or connections for a camera or other picture-processing as well as illumination means. The optics shown in FIG. 1 allows a field of view 26 in the radial direction with respect to the longitudinal axis X so that the region of the cylinder wall to be examined by the measuring device 20 may be observed by way of the optics. One may alternatively also use other optics 22 which have a field of view 26 in another direction.

An actuation rod 28 is further arranged in the inside of the shank 12, and this rod extends through the shank 12 parallel to the longitudinal axis X. The distal end of the actuation rod 28 is linked to the arm 14 in an articulated manner. With this, the point of articulation of the actuation rod 28 on the arm 14 is distanced from the pivot axis 16 in the direction of the longitudinal axis Y of the arm 14. This, by way of a longitudinal movement of the actuation rod 28 in the direction of the longitudinal axis X, permits the arm 14 to be able to be pivoted about the pivot axis 16 in the direction of the pivot angle α. The actuation rod 28 at its proximal end is in active connection with an adjustment wheel 30. The actuation rod 28 and the adjustment wheel 30 cooperate such that the actuation rod 28 is moved linearly in the direction of the longitudinal axis X and in this manner causes a pivoting of the arm 14.

Furthermore, in the region of the proximal end of the shank a scale 32 is attached to this, on which the insertion depth of the shank 12 in the guide sleeve 10 in the direction of the longitudinal axis X may be read off. The respective insertion depth is dependent on which position a measurement is to be carried out on the inner wall of the cylinder 2 by the measuring device 20. The insertion depth is thus also dependent on the respective motor and its construction type.

A scale ring 34 is arranged at the proximal end of the guide sleeve 10, by way of which the angular position of the shank 12 relative to the guide sleeve 10 may be read off, when the shank 12 is rotated about the longitudinal axis X in the guide sleeve 10. The scale ring 34 after screwing the guide sleeve 10 in the cylinder head 6 is adjusted to a predefined angular position so that on rotation of the shank 12 about the longitudinal axis X, an angular position of the shank 12 relative to the cylinder 2 may be read off at the scale ring. In this manner by way of the scale 32 and the scale ring 34 one may determine the position at which the measuring device 20 carries out a surface measurement in order subsequently to be able to exactly document the readings.

As explained, the shank 12 is linearly movable in the inside of the guide sleeve in the direction of the longitudinal axis X and is rotatable about the longitudinal axis X. At the same time the shank is guided in the guide sleeve 10 preferably without play. Furthermore at the proximal end of the guide sleeve 10 there is provided a clamp ring 35 with which the shank may be rigidly clamped in the guide sleeve 10 in order to fix it in its position relative to the guide sleeve 10.

The measuring device 20 is connected to a control and display apparatus 38 via a measurement or control lead which runs through the inside of the arm 14 and the shank 12 and exits at the proximal end out of the shank 12. The display apparatus 28 controls or monitors the measurement carried out by the measuring device 20 and displays the readings or outputs the readings in another manner.

The insertion of the technoscope into the cylinder 2 is described in more detail by way of the FIGS. 2 and 3. The FIGS. 2 and 3 show sectional views according to FIG. 1, wherein in the examples shown in the FIGS. 2 and 3 the longitudinal axis X is inclined with respect to the vertical about an angle β. In FIGS. 2 and 3 the arm 14 with the measuring device 20 is shown in an extended first position in which the longitudinal axis Y of the arm 14 and the measuring device 20 extend in the direction of the longitudinal axis X of the shank. In this position the whole technoscope is extended so that the outer diameter of the technoscope, also in the region of the measuring device 20 and of the arm 14, corresponds to the outer diameter of the shank 12. Furthermore in the FIGS. 2 and 3 the arm 14 is additionally shown in a pivoted position in which it is pivoted about the pivot angle α with respect to the longitudinal axis X so that the measuring device 20 comes into contact with the inner wall of the cylinder 2. The pivoting of the arm 14 is effected by the actuation rod 28 as described above.

In the extended first position in which the axis Y extends in the direction of the axis X and the measuring device 20 also extends in the longitudinal direction of the arm 14, the shank 12 with the measuring device 20 attached at the distal end via the arm 14 may be inserted through the guide sleeve 10 into the inner space of the cylinder 2. The whole means has a small diameter so that the technoscope may be easily introduced through the relatively small bore 8 for the injection nozzle. If the required insertion depth has been reached, which, as described above may be read off from the scale 32, the shank 12 is fixed in the guide sleeve 10 via the clamp ring 36 (not shown in FIGS. 2 and 3). Subsequently by way of actuating the actuation rod 28 via the adjustment wheel 30, the arm 14 is pivoted out by the angle α so that the measuring device 20 is brought into a position which is distanced radially further from the longitudinal axis X and comes into contact with the inner wall of the cylinder.

The measuring device 20 at the same time is freely movable about the pivot axis 18. Furthermore the center of gravity of the measuring device 20 in the vertical direction is located below the pivot axis 18 so that the measuring device 20 always attempts to align itself in the vertical direction. This has the advantage that if the arm 14 is brought into the extended position parallel to the longitudinal axis X, the measuring device likewise aligns in this extended position parallel to the longitudinal axis X in a self-adjusting manner. Furthermore this arrangement of the center of gravity of the measuring device 20 favors the bearing of the measuring device 20 on the inner wall of the cylinder 2, as is to be seen in FIGS. 2 and 3.

In the example according to FIG. 2, on pivoting out the arm 14 due to the self-adjusting vertical alignment of the measuring device 20, firstly the lower counter bearing 40 on a first end of the measuring device 20 comes into contact with the inner wall of the cylinder 2. If then the arm 14 is pivoted further, wherein the angle α is enlarged, the pivot axis 18 moves further to the inner wall of the cylinder 2 until it likewise comes into contact with the inner wall of the cylinder 2. If both counter bearings 40 and 42 are in contact with the inner wall, the measuring device 20 bears completely on the inner wall of the cylinder so that a measurement of the surface roughness may be carried out on the inner wall.

If the cylinder is inclined with respect to the vertical in the opposite direction, as is shown in FIG. 3, on pivoting out the arm 14, firstly the counter bearing 42 comes into contact with the inner wall of the cylinder. If the arm 14 is pivoted further, by way of this the pivot axis 18 is moved closer towards the cylinder wall 2, by which means the counter bearing 40 too is moved to the inner wall of the cylinder 2 until it bears on this. A complete bearing of the measuring device 20 on the surface to be examined is always achieved in this manner.

Figure 4:
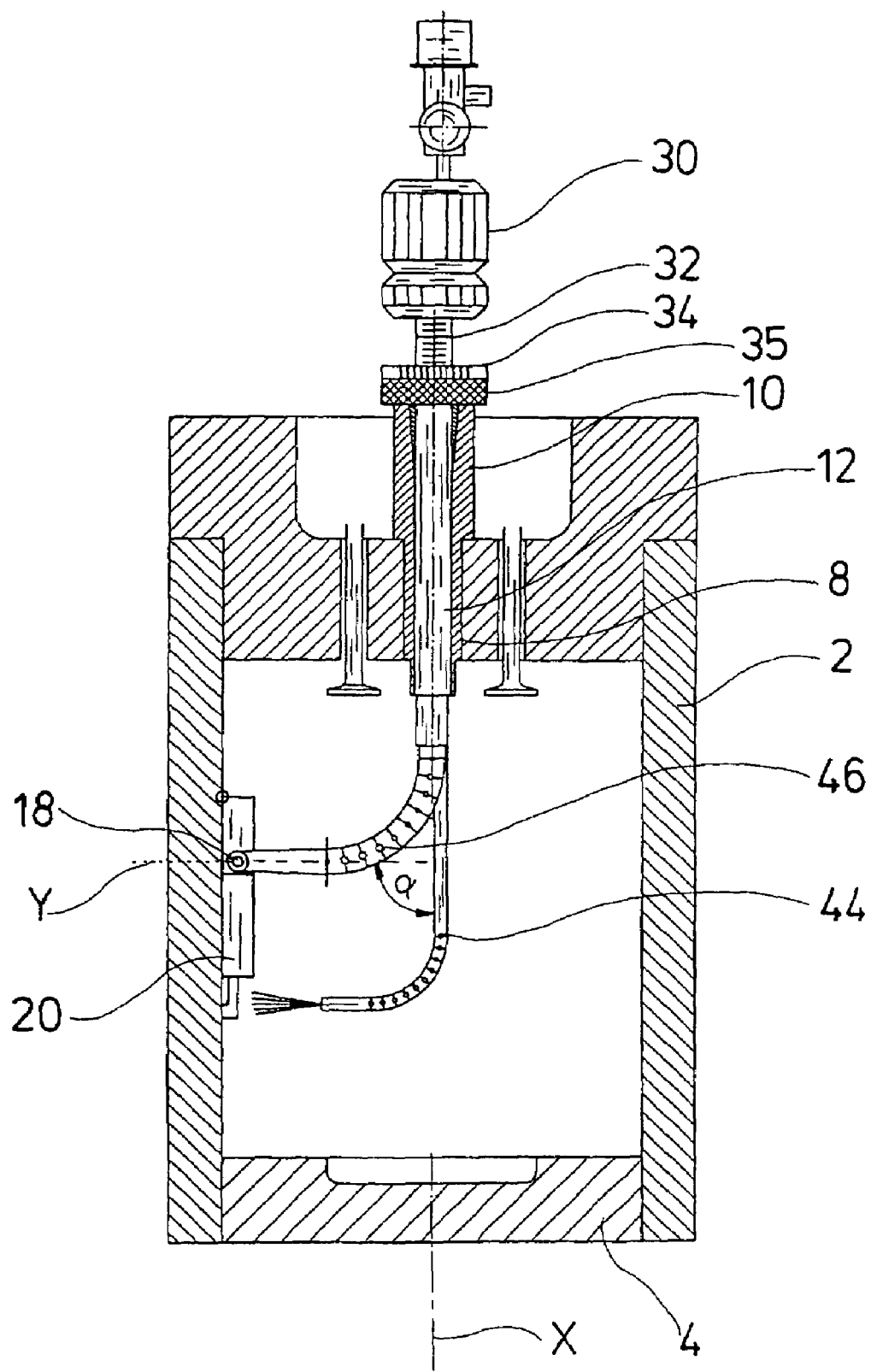

FIG. 4 shows a sectioned view of a cylinder 2 of a combustion motor, for example the motor of a ship, according to the representation in FIG. 1. The technoscope inserted into the cylinder 2 in FIG. 4 corresponds essentially to the technoscope described by way of FIGS. 1 to 3, wherein with the technoscope according to FIG. 4 a flexible arm 46 is provided instead of the arm 14. The flexible arm 46, as known from flexible endoscopes and technoscopes, may be infinitely curved and bent at an angle. By way of bending the arm 46, the distal end of the arm 46 may be deflected out via an actuation means arranged in the inside of the arm 46, such that the measuring device 20 is brought into a position radially distanced to the longitudinal axis X. With this one may achieve any pivot angle β between the longitudinal axis X and the longitudinal axis Y of the distal end of the arm 46. In the shown example the angle β is equal to 90 degrees. The flexible arm 46 thus replaces the above-described arm 14 with the pivot axis 16 between the arm 14 and shank 12. The flexible arm 46 is attached at the distal end of the shank 12.

Additionally with the embodiment example according to FIG. 4 there is provided a further shank 44 which may be introduced into the shank 12 from the proximal end. The shank 44 is likewise designed such that it may be bent at an angle or curved in the region of its distal end, according to the design of the arm 46. The shank 44 may be used for accommodating optics or for introducing machining tools such as pliers, brushes or cleaning n, into the inner space of the cylinder 2. By way of the possibility of curving the shank 44 or bending it at an angle it is possible to bring the distal end of the shank 44 likewise into the vicinity of the inner wall of the cylinder 2, in order here to be able to carry out machining and examination. The flexible part of the shank 44 is designed in a manner as is known from flexible endoscopes or technoscopes. A corresponding actuation means is provided in the inside of the shank 44 for the deflecting out. The construction of the technoscope otherwise corresponds to that construction described by way of FIGS. 1 to 3, which is why the same reference numerals have been used for the same components, and a further description of the components already described by way of FIGS. 1 and 3 is not made.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A technoscope for examining a surface in a confined space, said technoscope comprising:
    a shank having a longitudinal axis and a cross section;
    an arm which is pivotably mounted to said shank at a first pivot axis, said arm being pivotable from a first position, in which said arm extends in the direction of said longitudinal axis, to a second position, in which said arm extends transversely to said longitudinal axis; and
    a working device freely pivotably attached to said arm at a second pivot axis so that said working device contacts the surface to be examined in a self-adjusting manner, said second pivot axis extending normally of a plane in which said arm is pivotable relative to said shank
    wherein said working device has a center of gravity spaced from said second pivot axis so that said working device automatically aligns in a vertical direction.

2. The technoscope of claim 1, wherein said arm and said working device can be arranged completely within said cross section of said shank.

3. The technoscope of claim 1, wherein said arm has a proximal end which is mounted to said shank and a distal end to which said working device is freely pivotably attached.

4. The technoscope of claim 1, wherein said working device is a roughness measuring apparatus.

5. The technoscope of claim 1, wherein said working device has a longitudinal axis which is parallel to said longitudinal axis of said shank when said arm is in said first position.

6. The technoscope of claim 1, wherein said working device has a pair of opposed ends, said second pivot axis being arranged between said ends.

7. The technoscope of claim 1, further comprising an actuation rod received in said shank for pivoting said arm relative to said shank.

8. The technoscope of claim 7, further comprising an adjustment wheel for moving said actuation rod axially.

9. The technoscope of claim 1, further comprising optics received in said shank.

10. The technoscope of claim 1, further comprising a guide sleeve which can be fixed in an opening of a space to be examined, said shank being insertable into said guide sleeve.

11. The technoscope of claim 10, wherein said guide sleeve has an external thread.

12. The technoscope of claim 10, wherein said shank can be held in said guide sleeve so that said shank is displaceable at least one of longitudinally and rotatably with respect to said longitudinal axis.

13. The technoscope of claim 12, further comprising a gauge for reading at least one of penetration depth and angular position of said shank.

14. The technoscope of claim 1, wherein said arm is flexible.

15. The technoscope of claim 1, further comprising an additional shank which can be received through said shank, said additional shank being flexible.

16. The technoscope of claim 1, wherein said working device is a measuring device.

17. The technoscope of claim 1, wherein said second pivot axis is fixed parallel to said first pivot axis.

* * * * *